United States Patent
Singer (10) Patent No.: US 10,439,422 B2
(45) Date of Patent: Oct. 8, 2019

(54) WIRELESS POWER TRANSFER TO A MEDICAL COMPUTER CART

(71) Applicant: David Singer, Richmond Hill (CA)

(72) Inventor: David Singer, Richmond Hill (CA)

( * ) Notice: Subject to any disclaimer, the term of this patent is extended or adjusted under 35 U.S.C. 154(b) by 183 days.

(21) Appl. No.: 15/001,910

(22) Filed: Jan. 20, 2016

(65) Prior Publication Data

US 2016/0211695 A1    Jul. 21, 2016

Related U.S. Application Data

(60) Provisional application No. 62/105,267, filed on Jan. 20, 2015.

(51) Int. Cl.
*H02J 7/02* (2016.01)
*H02J 7/00* (2006.01)
*H02J 50/10* (2016.01)

(52) U.S. Cl.
CPC ............ *H02J 7/025* (2013.01); *H02J 7/0042* (2013.01); *H02J 50/10* (2016.02)

(58) Field of Classification Search
USPC ........................................................ 320/108
See application file for complete search history.

(56) References Cited

U.S. PATENT DOCUMENTS

| | | | | |
|---|---|---|---|---|
| 7,715,187 B2* | 5/2010 | Hotelling | .............. | G06F 1/1632 320/108 |
| 2011/0084659 A1* | 4/2011 | Niemann | .............. | H02J 7/0042 320/109 |
| 2013/0200579 A1* | 8/2013 | Abernethy | ................ | B62B 3/02 280/6.15 |
| 2014/0130381 A1* | 5/2014 | Jung | ........................ | A43B 7/00 320/108 |

OTHER PUBLICATIONS

Ergotron Healthcare, Supporting Care Everywhere, http://www.ergotron.com/Portals/0/literature/flyers/english/01-012.pdf, May 12, 2016.
Rubbermaid Healthcare, Mobile Computing Carts, https://www.rubbermaidhealthcare.com/ContentResources/Product%20Literature/Brochures/2013_RHC_MD059_Mobile_Computing_Cart.pdf, Retrieved Jul. 22, 2016.
Rubbermaid Healthcare, Swappable Batteries for Mobile Computing Carts, https://www.rubbermaidhealthcare.com/ContentResources/Product%20Literature/Product%20Sheets/2013_RHC_MD129_SwapBatteriesSellSht_.pdf, Retrieved Jul. 22, 2016.
Enovate Medical LLC, Mobius 3.5, MobiusPower, http://www.enovatemedical.com/wp-content/uploads/2015/09/PS012-01-Mobius_Power_Sales_Slick070814.pdf Feb. 11, 2015.
Capsa Solutions, Computer Workstations Guide, http://www.capsasolutions.com/LX_VX_eBrochure.pdf, Retrieved Jul. 22, 2016.

* cited by examiner

*Primary Examiner* — Robert Grant
(74) *Attorney, Agent, or Firm* — Ridout & Maybee LLP (57) ABSTRACT

A medical computer cart is equipped with an inductive receiver coil. The inductive receiver coil may, for example, be associated with a power management system adapted to use electrical power induced in the receiver coil to charge one or more batteries and/or provide power for operation of the medical computer cart. A charging station has an inductive charging transmitter coil corresponding to the inductive charging receiver coil in the medical computer cart. The inductive receiver coil may, alternatively, provide power for operation of the medical computer cart without the use of batteries.

6 Claims, 11 Drawing Sheets

WIRELESS POWER TRANSFER TO A MEDICAL COMPUTER CART

CROSS-REFERENCE TO RELATED APPLICATIONS

The present application is a continuation application of U.S. Patent Application No. 62/105,267, filed Jan. 20, 2015, the contents of which are hereby incorporated herein by reference.

FIELD

The present application relates generally to medical computer carts and, more specifically, to a powered medical computer cart that uses a wireless charging station.

BACKGROUND

The equipment used for bedside charting and monitoring in hospitals can be expensive and is not always required for every patient. Furthermore, to have such equipment fixed and stationary beside an empty bed may be seen as wasteful to administrators that are looking to rein in costs. Accordingly, such bedside charting and monitoring equipment is increasingly provided in the form of a mobile medical computer cart that may be moved to wherever bedside charting and monitoring is needed. Manufacturers of mobile medical computer carts have recognized that such carts are preferably compact, lightweight and ergonomic.

BRIEF DESCRIPTION OF THE DRAWINGS

Reference will now be made, by way of example, to the accompanying drawings which show example implementations; and in which.

DETAILED DESCRIPTION

As a power outlet may not always be convenient to the preferred location of the bedside charting and monitoring equipment, mobile medical carts may be provided with rechargeable batteries.

In their attempts to provide healthcare workers with 24 hours of mobile power for bedside charting and monitoring, manufacturers of mobile medical computer carts have explored various methods of recharging the rechargeable batteries. In common with consumer electronics, such as compact cameras and cellular phones, manufacturers of mobile medical computer carts have noted that the rechargeable batteries may be recharged in a charging device that is external to the mobile medical computer cart or may be recharged while remaining inside the mobile medical computer cart.

Manufacturers of mobile medical computer carts have recognized that rechargeable batteries in a mobile medical computer cart may be removed once the batteries have become discharged and replaced with fully charged batteries. However, rechargeable batteries that can be swapped out for fully charged batteries are sometimes overly heavy and inconvenient, causing reluctance of staff participating in a scheduled swap plan. Once a mobile medical computer cart has become inoperable, due to a discharged battery, it is often the case that the inoperable mobile medical computer cart is left for "someone else" to replace the battery. If left for too long, the rechargeable battery may deplete its charge beyond a safe level, resulting in a permanently defective battery and an out of service mobile medical computer cart until the permanently defective battery is replaced. In some cases, hospitals have dedicated personnel to deal with replacing discharged batteries with fully charged batteries. Unfortunately, such dedicated personnel may be perceived as adding to the operating cost of the mobile medical computer carts.

Notably, batteries that recharge inside mobile medical computer carts as a result of being plugged into a wall outlet are known to, in some cases, require scheduled charging downtime for up to five hours. In a manner similar to the mobile medical computer carts whose batteries are designed to be removed and charged externally, mobile medical computer carts whose batteries are designed to be charged internally may also become inoperable and left discharged and, if left for too long, the battery may deplete its charge beyond a safe level, resulting in a permanently defective battery and an out-of-service mobile medical computer cart until the battery is replaced.

According to an aspect of the present disclosure, there is provided a mobile medical cart. The mobile medical cart includes an on-board rechargeable battery, battery charging circuitry and an inductive charging receiver integrated into the battery charging circuitry. The inductive charging receiver is adapted to generate electrical current, for use in the battery charging circuitry, based upon proximity to an operating inductive charging transmitter external to the mobile medical cart.

Figure 1:
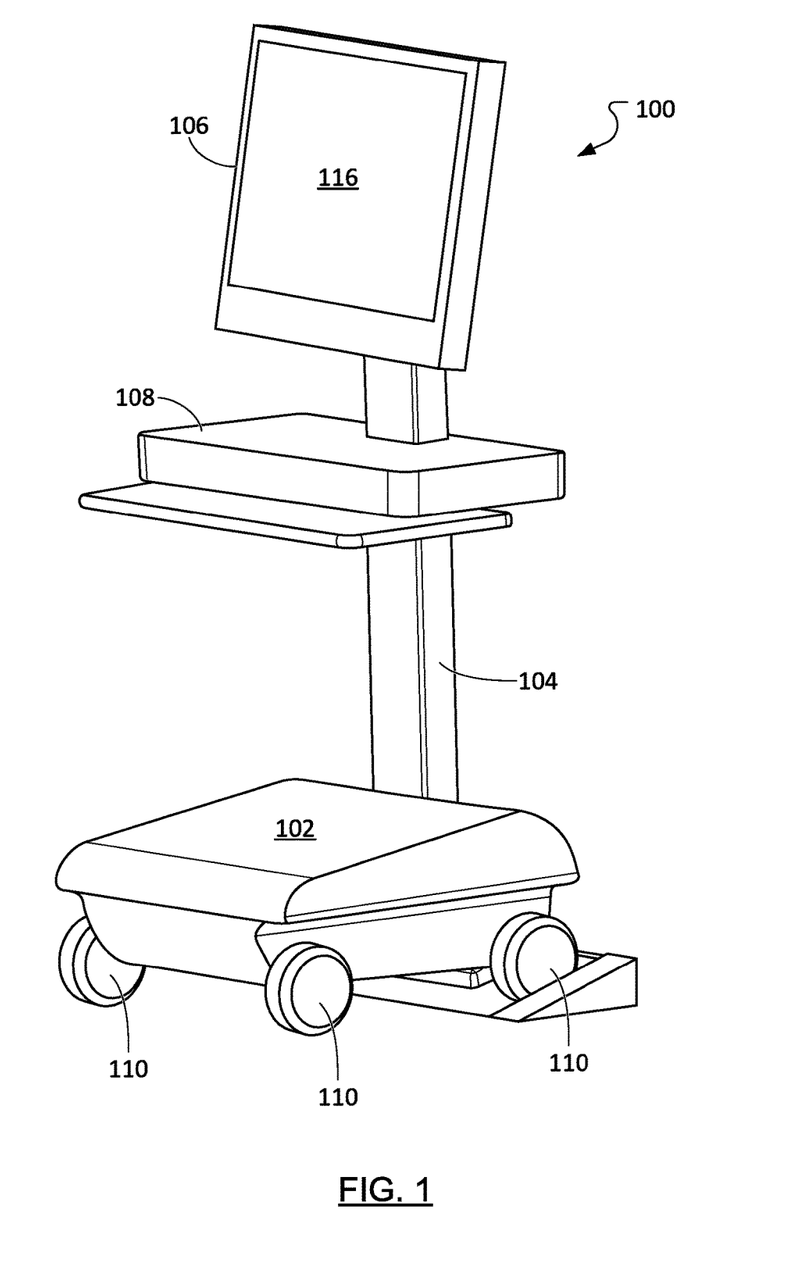
FIG. 1 illustrates a medical computer cart according to an aspect of the present application.

FIG. 1 illustrates a medical computer cart 100 according to aspects of the present application. The medical computer cart 100 includes a base 102 enclosing one or more batteries (see FIG. 11). Extending upward from an aft side of the base 102 is a vertical support pillar 104. The medical computer cart 100 includes a display unit 106 and a monitoring unit 108 attached to the vertical support pillar 104. The display unit 106 includes a display screen 116. Mobility of the medical computer cart 100 is enhanced by wheels 110 attached to the base 102.

It should be clear to a person of ordinary skill in the art of medical computer carts, that, in operation, the monitoring unit 108 and the display unit 106 derive electrical power from the one or more batteries in the base 102 and, to supply such power, that electrical current may flow in wires (not shown) in the vertical support pillar 104. Furthermore, changes in that which is displayed upon the display screen 116 may occur responsive to input received and processed at the monitoring unit 108.

In overview, as an alternative to removing the one or more batteries from the base 102 for recharging in an external charging device or finding a place to plug in the medical computer cart 100 to recharge the batteries while the batteries remain in the base 102, it is proposed herein to employ inductive charging stations.

Inductive charging uses an electromagnetic field to transfer energy between two objects. An inductive coupling is established between an inductive charging transmitter and an inductive charging receiver.

Typically, a first induction coil, in the inductive charging transmitter, creates an alternating electromagnetic field and a second induction coil, in the inductive charging receiver takes power from the alternating electromagnetic field and converts the power into electrical current. The two induction coils in proximity combine to form an electrical transformer.

It is proposed herein to equip the medical computer cart 100 with an inductive charging receiver associated with a base power management system (see FIG. 11) for the one or more batteries in the base 102.

Figure 2:
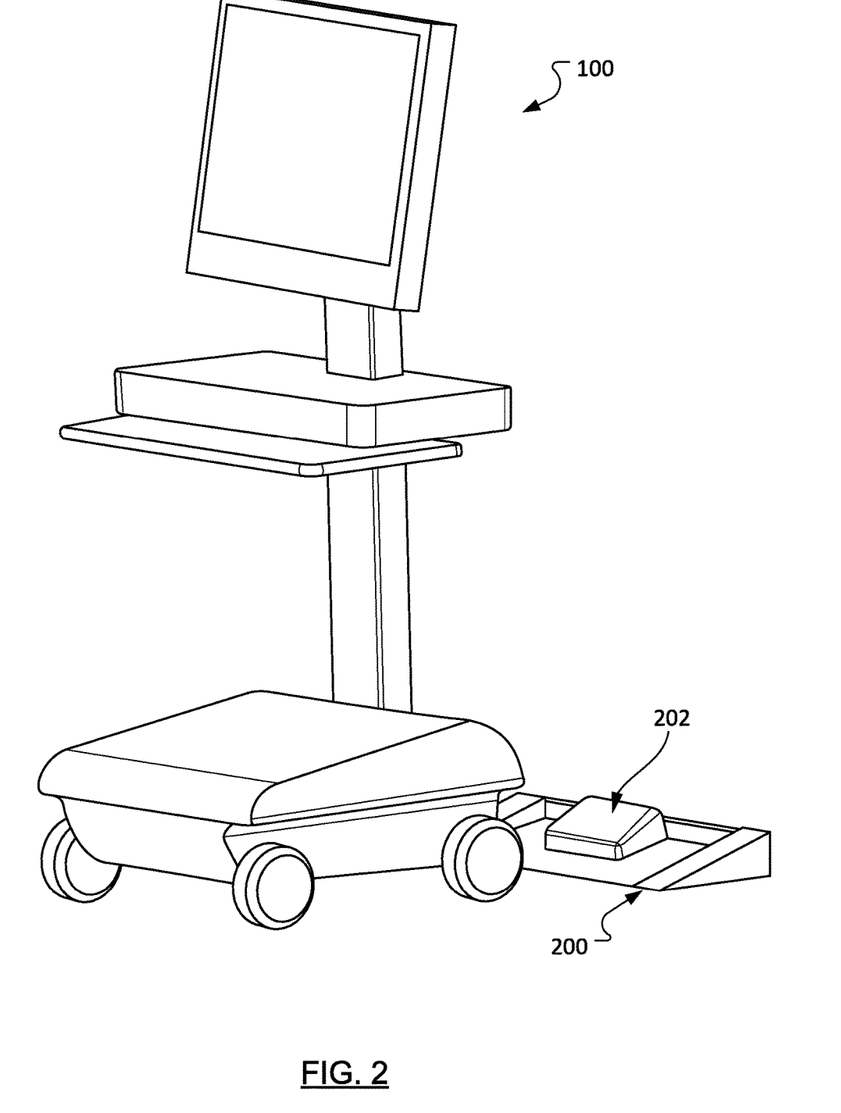
FIG. 2 illustrates the medical computer cart of FIG. 1 and a charging station according to an aspect of the present application.

In one aspect of the present application, illustrated in FIG. 2, an inductive charging transmitter 202 is positioned within a floor-level charging station 200.

Figure 3:
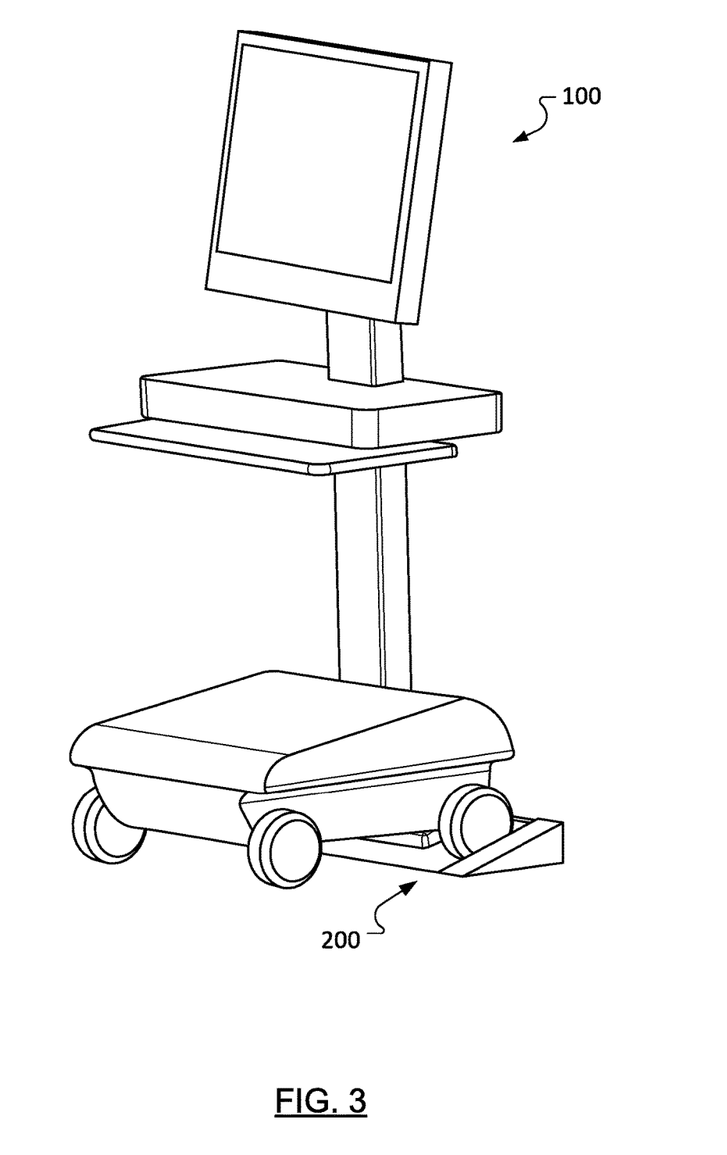
FIG. 3 illustrates the medical computer cart of FIG. 1 coupled with the charging station of FIG. 2.

FIG. 3 illustrates the medical computer cart 100 received by the floor-level charging station 200 of FIG. 2.

Figure 4:
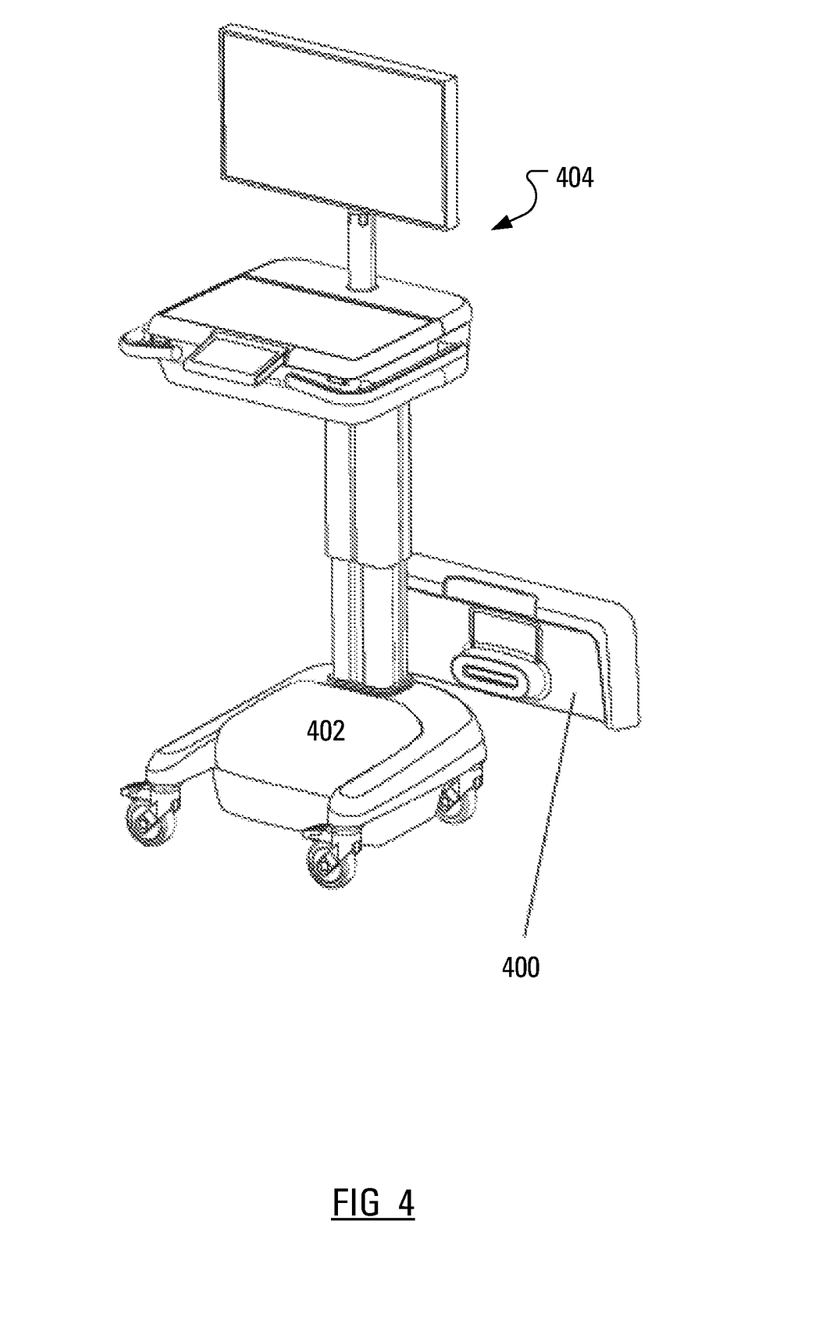
FIG. 4 illustrates a medical computer cart and a corresponding charging station according to an aspect of the present application.

In another aspect of the present application, illustrated in FIG. 4, an inductive charging transmitter is positioned within a baseboard-level charging station 400. A medical computer cart 404 includes a base 402 that is adapted for use with the baseboard-level charging station 400.

Figure 5:
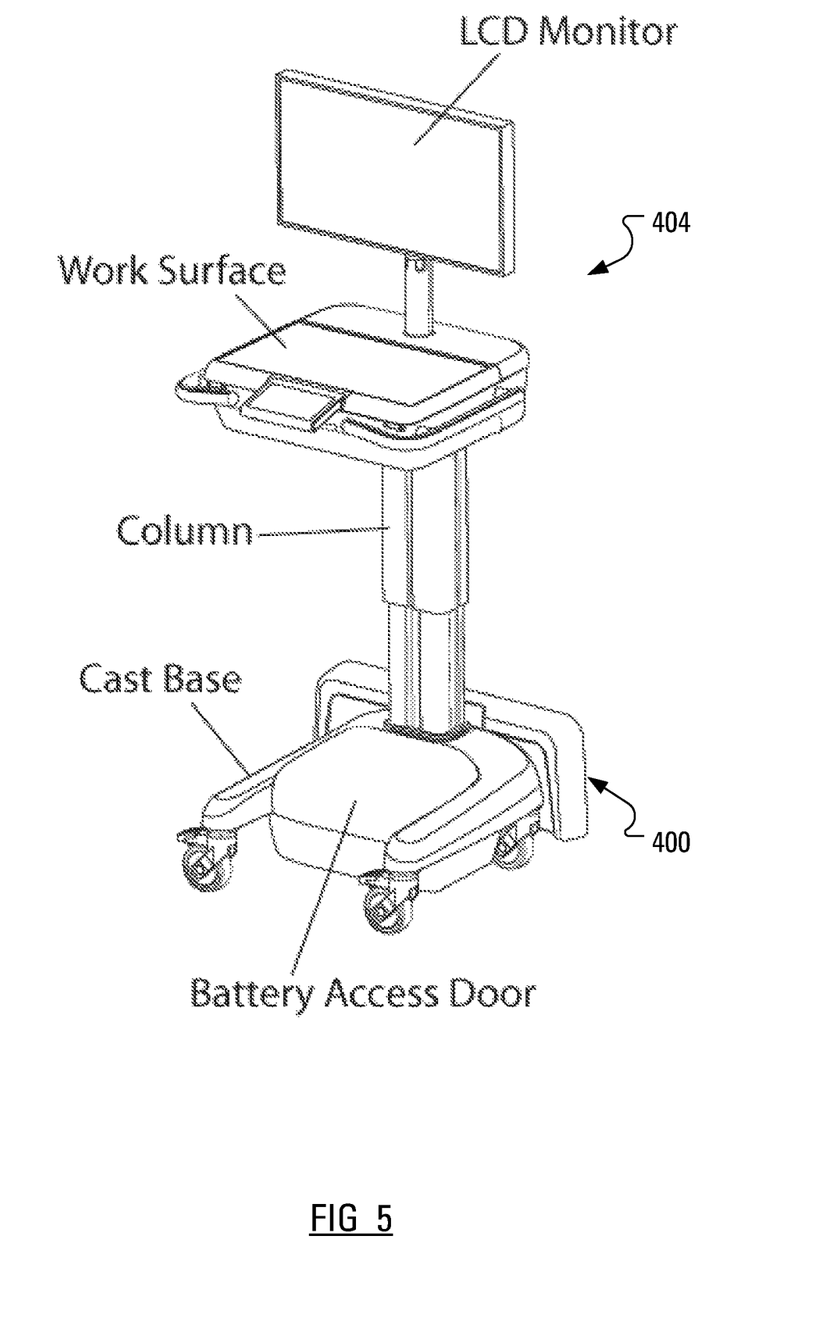
FIG. 5 illustrates the medical computer cart of FIG. 4 coupled with the charging station of FIG. 4.

FIG. 5 illustrates the medical computer cart 402 of FIG. 4 received by the baseboard-level charging station 400 of FIG. 4.

Figure 6:
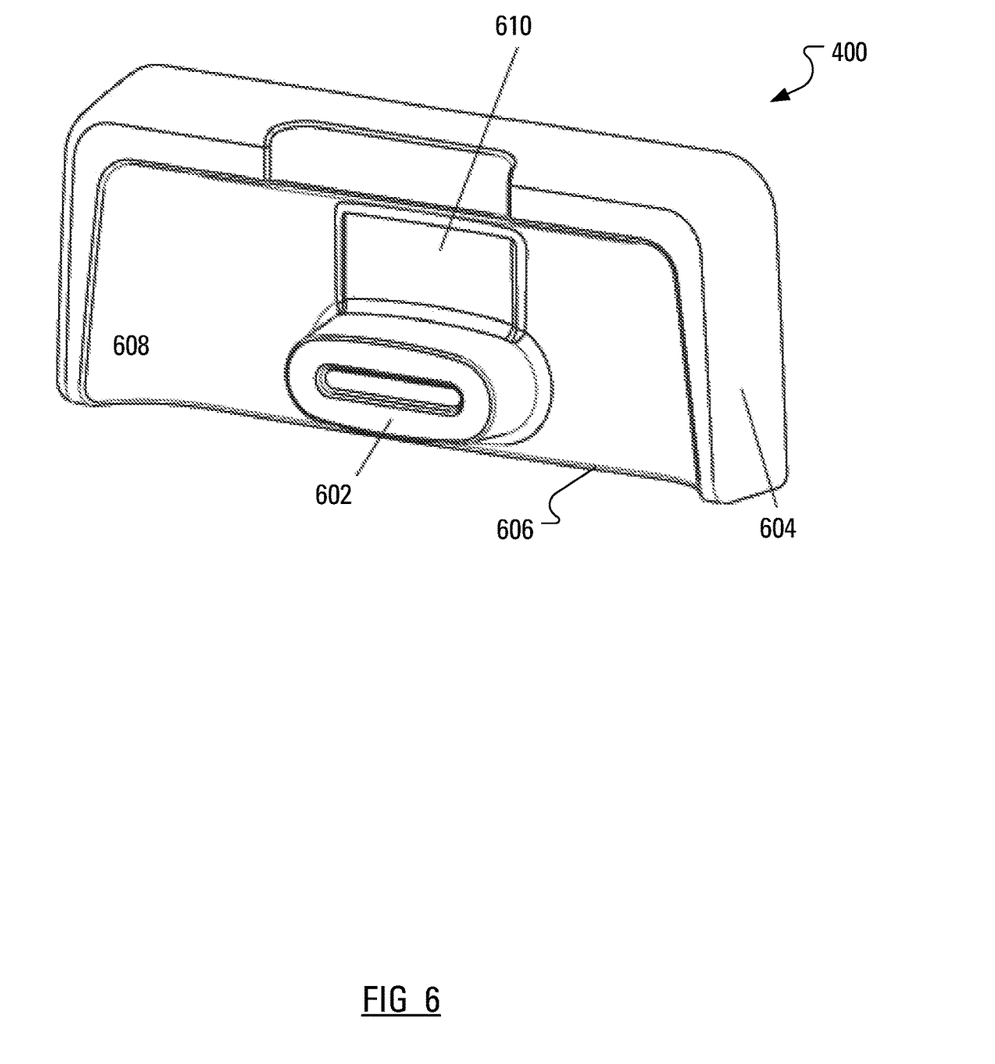
FIG. 6 illustrates the charging station of FIG. 4 in greater detail.

The baseboard-level charging station 400 of FIG. 4 is illustrated in greater detail in FIG. 6 to include an oval protrusion inductive charging transmitter 602 extending from the baseboard-level charging station 400. The baseboard-level charging station 400 includes a foundation 606 adapted for attachment to a wall. The oval protrusion inductive charging transmitter 602 protrudes outward, in a direction away from (normal to) the wall, from the foundation 606.

Figure 7:
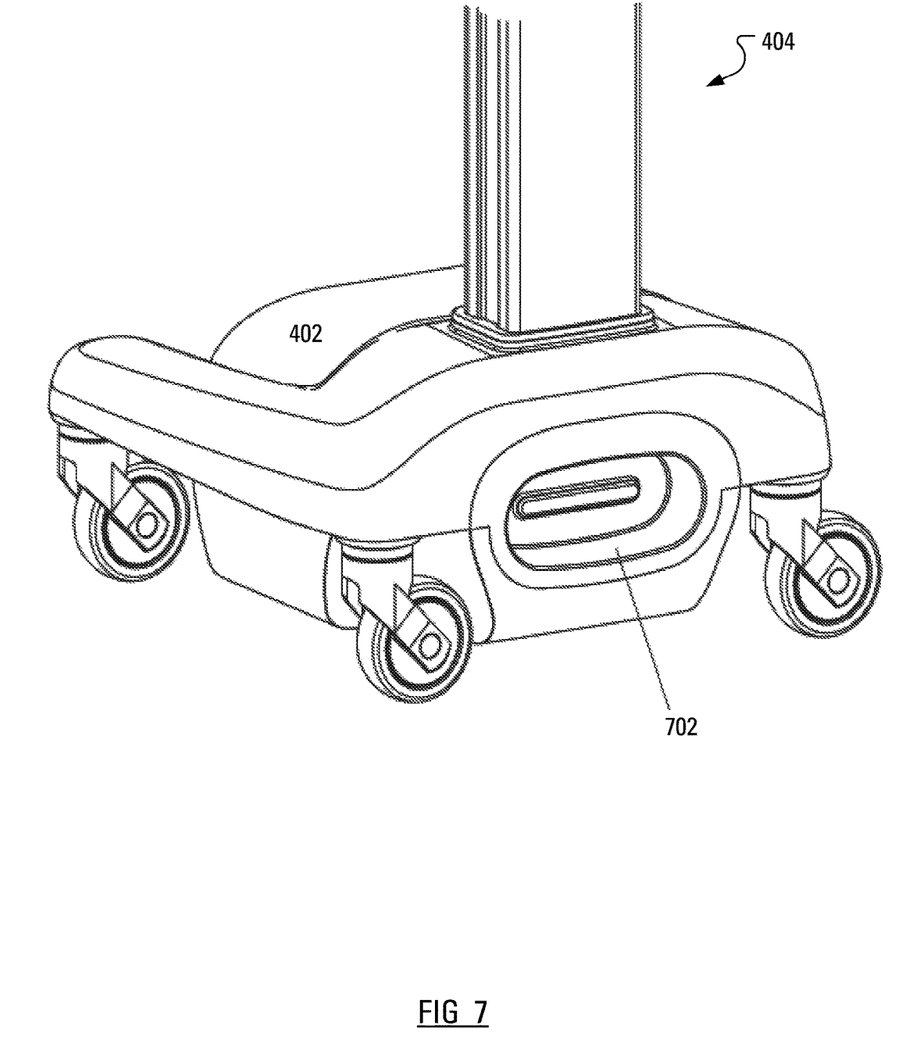
FIG. 7 illustrates, in rear perspective view, a base for the medical computer cart of FIG. 4.

The base 402, in this aspect, has an inductive charging port 702, illustrated in FIG. 7, in the form of a recess with a size and shape corresponding to the size and shape of the oval protrusion inductive charging transmitter 602, so that the oval protrusion inductive charging transmitter 602 may be received within the inductive charging port 702 to allow for inductive charging to occur.

Returning to FIG. 6, also protruding outward, in a direction away from (and normal to) the wall, from the foundation 606 is a perimeter shield 604. The perimeter shield 604 is shaped to include wings at horizontally spaced opposite ends of the foundation 606. The perimeter shield 604 is also shaped to include an overhang at the top of the foundation 606. The wings and overhang may perform many functions. One such function may involve an inner wall 608 that is curved in such a way as to correct the trajectory of the base 402, when the base 402 is approaching the baseboard-level charging station 400, so that the inductive charging port 702 in the base 402 may more accurately align with the oval protrusion inductive charging transmitter 602 as the base 402 approaches the baseboard-level charging station 400.

Conveniently, each wing may house one or more magnets (not shown), either of the passive (permanent) or active (electromagnet) variety. Such magnets may be used with corresponding magnets (not shown) in the base 402 to help maintain a docking arrangement between the base 402 and the baseboard-level charging station 400. Furthermore, the overhang and/or the foundation 606 may define a space or a notch to act as a heat exchange chimney.

In the case where there are various electronic components to be housed within the shell of the baseboard-level charging station 400, it may be preferable to house the electronic components within the wings or the overhang. Doing so may mitigate a risk that the electronic components may be compressed between the shell of the foundation 606 of the baseboard-level charging station 400 and the wall to which it is mounted, since, in routine operation, the base 402 will be repeatedly pressed against the baseboard-level charging station 400.

In keeping with the wish to allow the inductive charging port 702 and the oval protrusion inductive charging transmitter 602 to intuitively align, the oval protrusion inductive charging transmitter 602 may be formed in a shape that may be described as a frustum of an oval cone.

Furthermore, the oval protrusion inductive charging transmitter 602 may be configured to not energize unless the base 402 is sufficiently aligned in a charging position. Accordingly, the oval protrusion inductive charging transmitter 402 may not be wastefully generating an induction field without a receiver ready to receive.

When manufacturing the baseboard-level charging station 400, an integral unit of molded material (e.g., plastic, fiberglass) may form a shell. Alternatively, various elements, such as the wings, the overhang and the oval protrusion inductive charging transmitter 602 may be separately mounted to the foundation 606. Indeed, the mount for the oval protrusion inductive charging transmitter 602 may include biasing members (not shown) to further allow for adaptable coupling between the oval protrusion inductive charging transmitter 602 and the inductive charging port 702 in the base 402.

Figure 8:
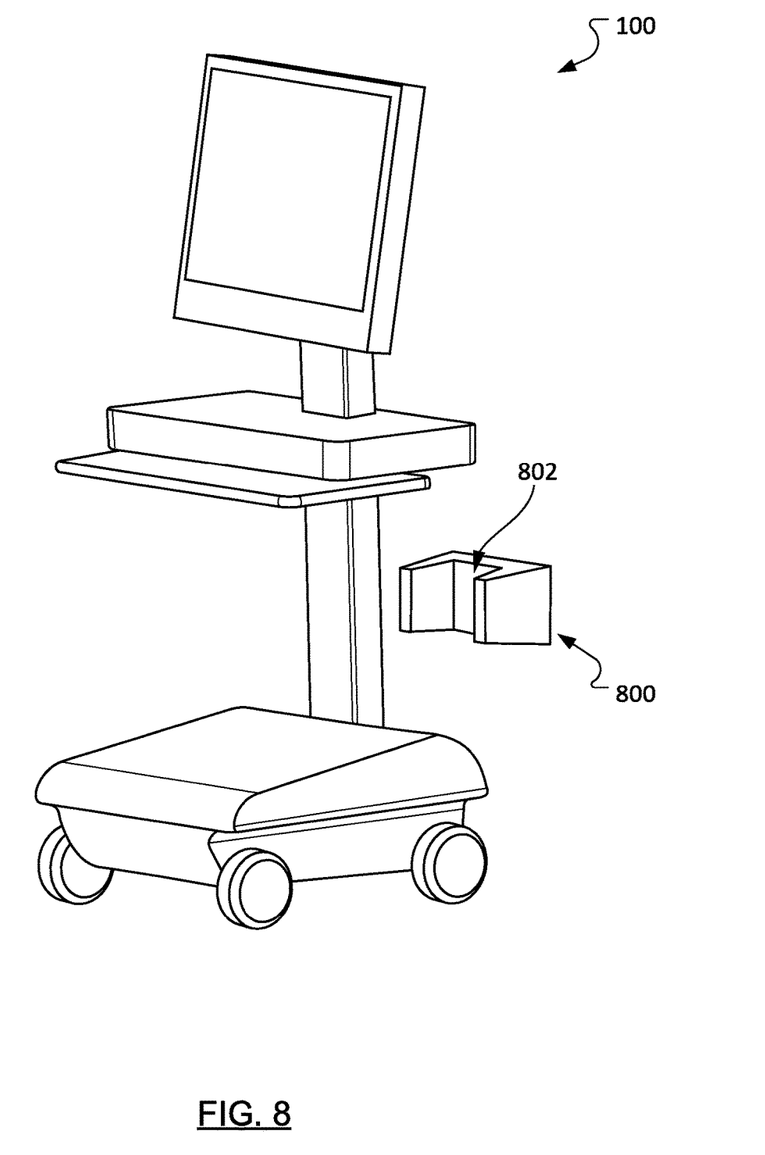
FIG. 8 illustrates the medical computer cart of FIG. 1 and a charging station according to an aspect of the present application.

In a further aspect of the present application, illustrated in FIG. 8, an inductive charging transmitter 802 is positioned within a wainscot-level charging station 800.

Figure 9:
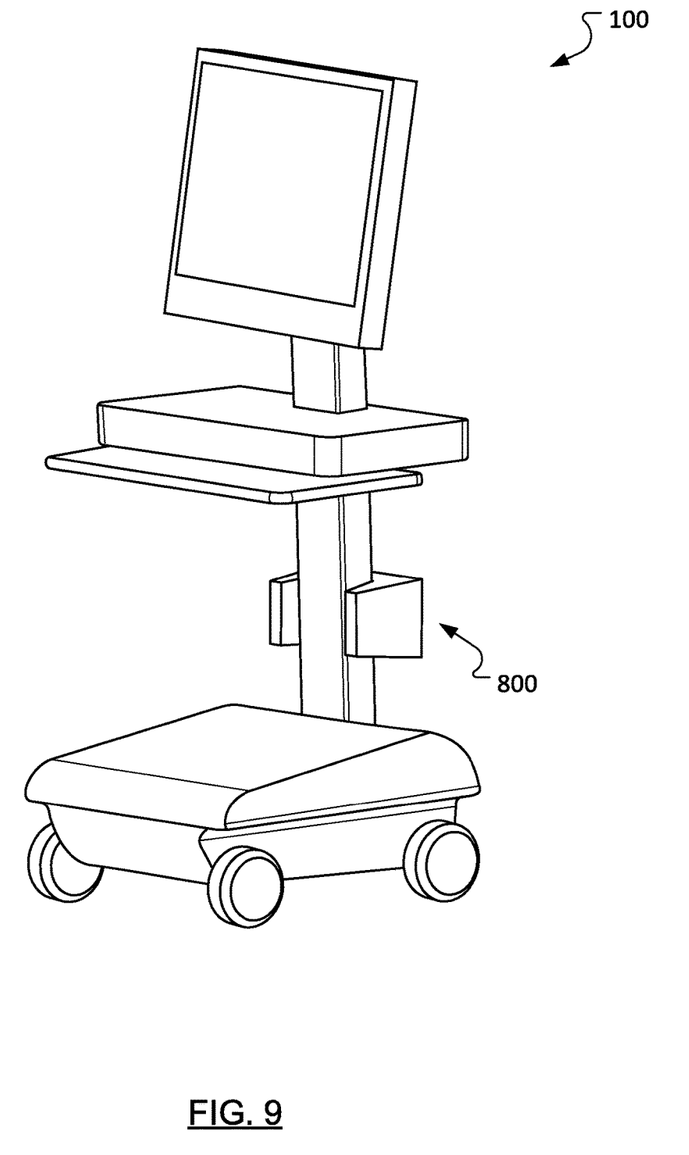
FIG. 9 illustrates the medical computer cart of FIG. 1 coupled with the charging station of FIG. 8.

FIG. 9 illustrates the medical computer cart 100 received by the wainscot-level charging station 800 of FIG. 8.

A person of ordinary skill in the art of inductive charging is likely to recognize that the transmitter 202 (FIG. 2) and the transmitter 802 (FIG. 8) rely on a flat coil design. In contrast, the shape (frustum of an oval cone) of the oval protrusion inductive charging transmitter 602 may allow for improved power throughput, relative to a flat coil design, when charging the battery in the base 402.

In one aspect of the present application, the medical computer cart 100, 404 includes a component for displaying an indication of a quality metric. The quality metric may relate to a quality of a coupling between the oval protrusion inductive charging transmitter 602 and the inductive charging port 702 in the base 402.

It should be appreciated that, although the oval protrusion inductive charging transmitter 602 has been illustrated as being mounted with a horizontal orientation for its longest dimension, the oval protrusion inductive charging transmitter 602 may be mounted with a vertical orientation for its longest dimension.

An integral molded shell can be shown to be a beneficial design choice, since rounded edges that most likely result from the molding process promote beading and gravityassisted removal of drops of liquid, which drops may land on the baseboard-level charging station 400 in a health care environment.

Figure 10:
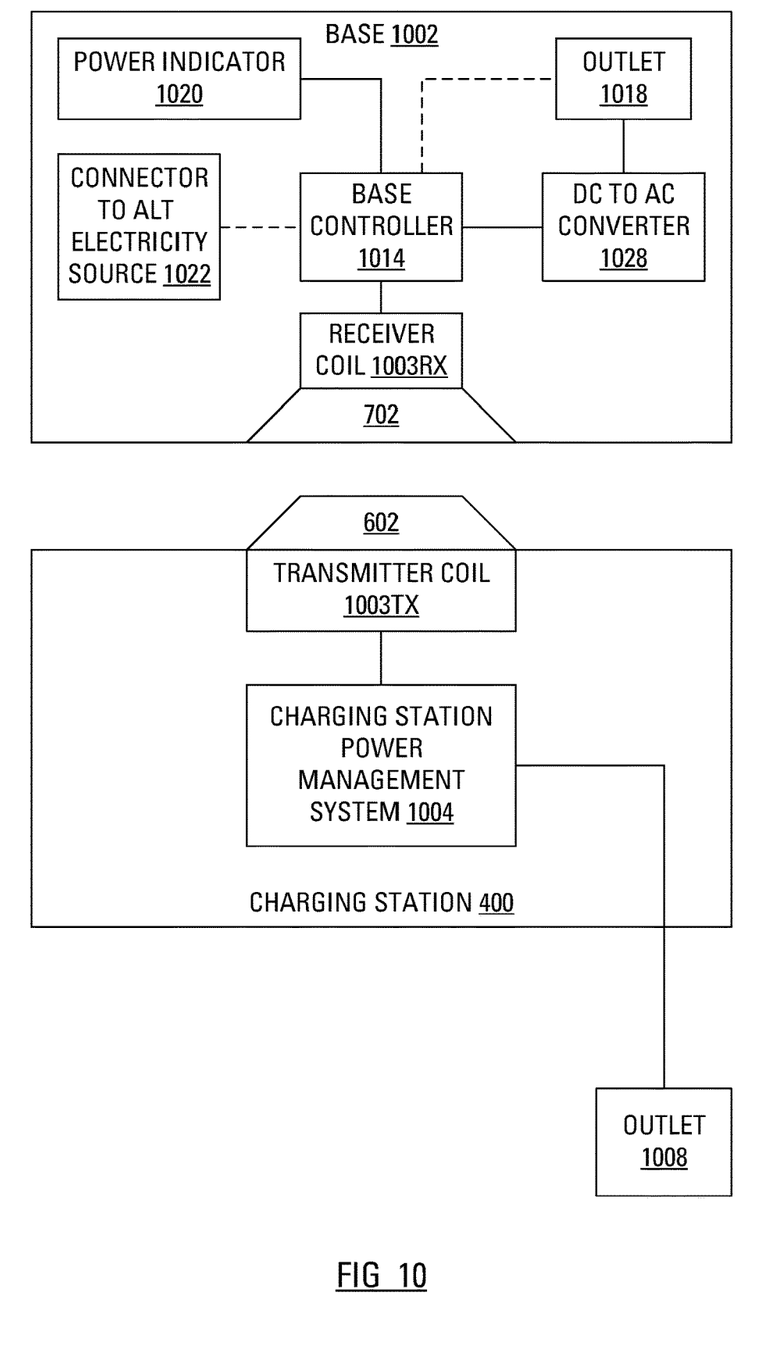
FIG. 10 illustrates, in block diagram format, example elements for the charging station of FIG. 6 and the base of FIG. 7 according to an aspect of the present application.

FIG. 10 illustrates, in block diagram format, example elements for the charging station 400 and a base 1002 acting as an example of the base 402 of FIGS. 4 and 7. In particular, the charging station 400 includes a charging station power management system 1004 adapted to connect to an electrical outlet 1008 and to a transmitter coil 1003TX associated with the oval protrusion inductive charging transmitter 602.

As part of the base 1002, a receiver coil 1003RX is associated with the inductive charging port 702. The base 1002 further includes a base power controller 1014 with connections to an on-base outlet 1018, a DC-to-AC converter 1028, a power indicator 1020 and a connector to an alternative electricity source 1022. The power indicator 1020 may, for example, be implemented as a Light Emitting Diode (LED) with an integral controller.

In operation, the charging station power controller 1004 receives Alternating Current ("AC") electrical power from the electrical outlet 1008 and provides AC current to the transmitter coil 1003TX associated with the oval protrusion inductive charging transmitter 602.

At the base 1002 of FIG. 10, as long as the oval protrusion inductive charging transmitter 602 is properly lined up with the inductive charging port 702, the AC current in the transmitter coil 1003TX induces an AC current in the receiver coil 1003RX.

The base power controller 1014 may, upon sensing the AC current in the receiver coil 1003RX, transmit a signal to the power indicator 1020. At the power indicator 1020, the integral controller may, responsive to receiving the signal from the base power controller 1014, turn on the LED to indicate that the base 1002 is receiving power.

In some embodiments, the base power controller 1014 may act to provide pulsed Direct Current ("DC") electrical power, derived from the induced AC current in the receiver coil 1003RX, to the DC-to-AC converter 1028. The DC-to-AC converter 1028 may then make AC power available at the on-base outlet 1018.

During those times wherein the oval protrusion inductive charging transmitter 602 is disengaged from the inductive charging port 702, the base power controller 1014 may act as a direct connection between the alternative electricity source connection 1022 and the on-base outlet 1018. That is, a power cord (not shown) may be plugged into an electrical outlet (not shown) such that AC power from the electrical outlet is available at the on-base outlet 1018.

Figure 11:
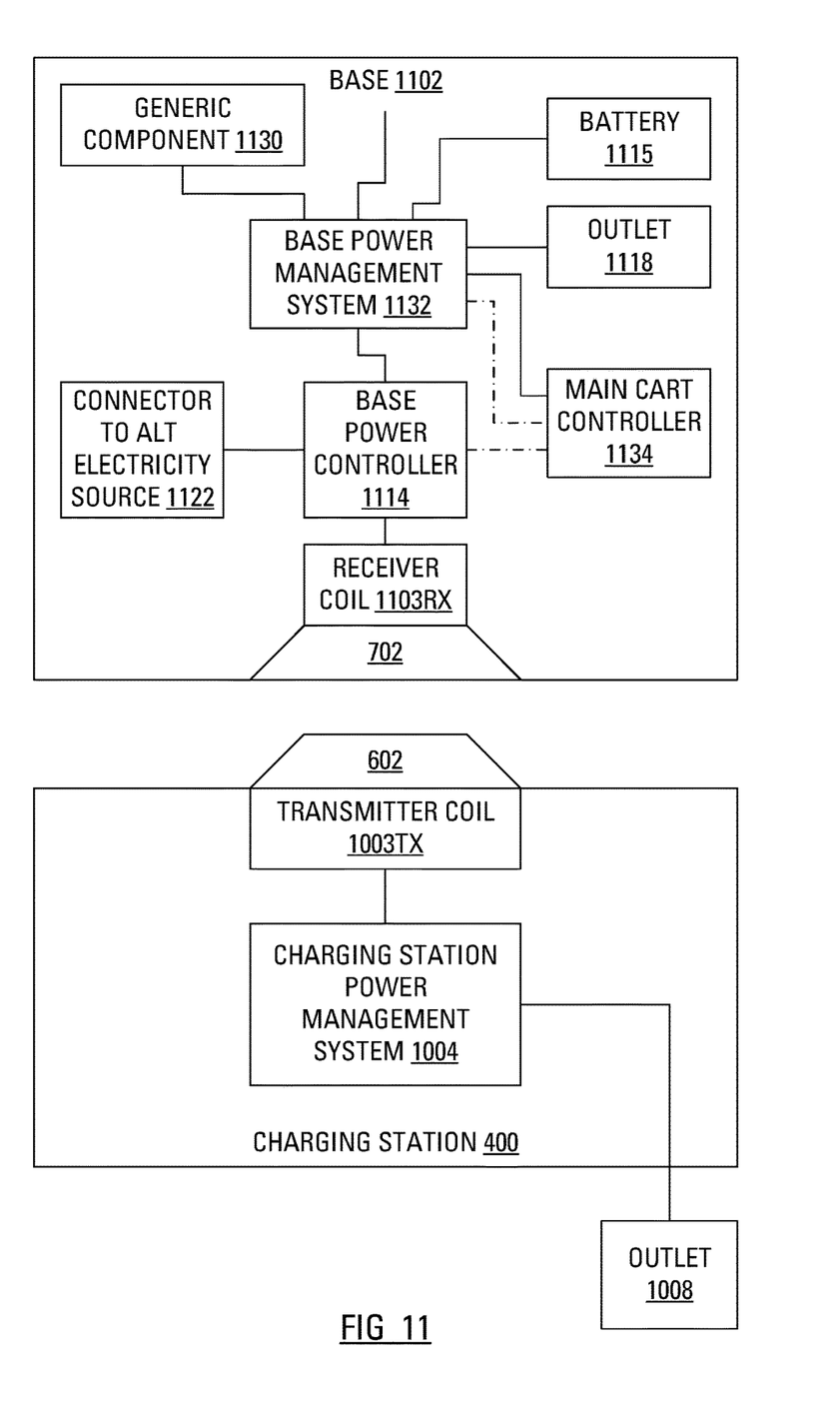
FIG. 11 illustrates, in block diagram format, example elements for the charging station of FIG. 6 and the base of FIG. 7 according to an aspect of the present application.

FIG. 11 illustrates, in block diagram format, example elements for the charging station 400 and a base 1102 acting as an example of the base 402 of FIGS. 4 and 7.

As part of the base 1102, a receiver coil 1103RX is associated with the inductive charging port 702. The base 1102 further includes a base power controller 1114 with power transfer connections to an alternative electricity source 1122 and to a base power management system 1132. The base power management system 1132 maintains power transfer connections to a generic component 1130, a battery 1115, an on-base outlet 1118 and a main cart controller 1134. An additional power transfer connection is illustrated emanating from the base power management system 1132 to represent that components other than the generic component 1130 may also be connected to the base power management system. While the base power management system 1132 may be configured to supply power at a DC 5 Volt (V) level for the generic component 1130, the base power management system 1132 may also be configured to supply power at a DC 19 V level for another component (not shown) and may be configured to supply power at a DC 12 V level for the 1134 main cart controller.

In addition to the power transfer connection to the main cart controller 1134, the base power management system 1132 also maintains a communication channel with the main cart controller 1134. Furthermore, the base power controller 1114 maintains a communication channel with the main cart controller 1134.

At the base 1102 of FIG. 11, as long as the oval protrusion inductive charging transmitter 602 is properly lined up with the inductive charging port 702, the AC current in the transmitter coil 1003TX induces an AC current in the receiver coil 1103RX.

The base power controller 1114 may, upon sensing the AC current in the receiver coil 1103RX, provide power to the base power management system 1132.

The base power management system 1132 may employ the power received from the base power controller 1114 to charge the battery 1115. Additionally, the base power management system 1132 may employ the power received from the base power controller 1114 to provide power to the generic component 1130. Notably, the generic component 1130 may be seen as representative of one or more of such components as the display unit 106, the display screen 116 and the monitoring unit 108 (see FIG. 1).

Furthermore, the base power management system 1132 may employ the power received from the base power controller 1114 to provide power to the main cart controller 1134.

In some embodiments, the base power management system 1132 may employ the power received from the base power controller 1114 to provide power to the on-base outlet 1118.

During those times wherein the oval protrusion inductive charging transmitter 602 is disengaged from the inductive charging port 702, the base power management system 1132 may distribute electrical power, derived from energy stored in the battery 1115, to the generic component 1130 and to the main cart controller 1134.

Furthermore, in the cases wherein the oval protrusion inductive charging transmitter 602 is disengaged from the inductive charging port 702, the base power management system 1132 may distribute electrical power derived from the alternative electricity source 1122. That is, the base power management system 1132 may distribute power received at the base 1102 via a power cord (not shown) plugged into an electrical outlet (not shown).

Conveniently, the components 1130 mounted to the medical computer cart 100, 404 are electrically isolated from the electrical outlet 1008 that provides power to the charging stations 200, 400, 800. As such, no ground fault interruption circuitry is required and the components 1020 are, by default, protected from electrical power surges in the electrical outlet 1008.

Notably, a given charging station 200, 400, 800 may be hard-wired to an electrical power source or may be portable and may include the alternative electricity source connection (e.g., a cord) 1022 (FIG. 10) with a plug for inserting into an electrical outlet. The operation of aspects of the present application will, of course, be independent of the voltage of the electrical power source. The electrical power source may, for example, be a North American 120/240 V and 60 Hz or European 220 V and 50 Hz.

It should be recognized that, with appropriate circuitry in both the base 102 and the charging station 200, 400, 800, data may be exchanged between the two elements through modulation of the induction fields used in the charging process.

In addition to the illustrated embodiments, the Applicant notes that, with some adaptation, a charging station may be attached to a wall, a floor, the foot of a bed, cabinetry or a headwall and allows the cart operator to push the medical computer cart 100 up to a charging station and begin charging the battery.

Through the positioning of a charging station 200, 400, 800 proximate to a patient, charging of the batteries may be integrated into positioning of the medical computer cart 100, 404 for routine operation with minimal effort on the part of the cart operator and minimal effect on staff work flow. Conveniently, relative to a plug-in-to-charge medical computer cart, medical computer cart down time may be minimized, safety may be enhanced through the elimination of wire clutter tripping hazards and wire handling is also minimized.

Notably, the charging stations 200, 400, 800 may be used in conjunction with a medical computer cart 100, 404 that does not include a battery. That is, the power received from the charging station 200, 400, 800 may be converted directly for use by components mounted to the medical computer cart 100, 404. Furthermore, some medical computer carts 100, 404 may be equipped with a retractable backup power cord for plugging the base 102, 402 into a standard power receptacle when a charging station is not readily available.

Conveniently, the frequency of the magnetic signal generated by the charging station 200, 400, 800 may be selected to minimize electromagnetic interference. A frequency of 33 kHz has been found to be suitable.

It is expected that inductive power transfer at the scale proposed herein (say 200 W to 600 W) will generate heat. As such, the charging station 200, 400, 800 may be equipped with a heat sink for quick heat dissipation via, for example, natural or active convection.

It may be appreciated that a DC design may be shown to reduce the quantity and complexity of circuitry in the charging station power management system 1004, thereby promoting economic savings relative to an AC design, even though an AC design is viable.

Other aspects and features of the present disclosure will become apparent to those of ordinary skill in the art upon review of the following description of specific implementations of the disclosure in conjunction with the accompanying figures.

The above-described implementations of the present application are intended to be examples only. Alterations, modifications and variations may be effected to the particular implementations by those skilled in the art without departing from the scope of the application, which is defined by the claims appended hereto.

What is claimed is:

1. A medical computer cart comprising:
a base defining a recess;
an on-board rechargeable battery;
a base power management system; and
an inductive charging receiver coil in electrical communication with the base power management system and adapted to generate electrical current, for use by the base power management system to charge the battery, based upon proximity to an operating inductive charging transmitter coil external to the medical computer cart;
wherein the recess has a size and a shape corresponding to a size and shape of a protrusion housing the inductive charging transmitter coil, wherein the shape of the protrusion is a frustum of an oval cone and the shape of the inductive charging transmitter coil is a frustum of an oval cone;
wherein the inductive charging transmitter coil is associated with a charging station; and
wherein the base includes magnets positioned to align with corresponding magnets in the charging station to help maintain a docking arrangement between the base and the charging station.

2. The medical computer cart of claim 1 wherein the on-board rechargeable battery is housed within the base.

3. The medical computer cart of claim 2 wherein the inductive charging receiver coil is located proximate an underside of the base.

4. The medical computer cart of claim 2 wherein the inductive charging receiver coil is located proximate an aft end of the base.

5. The medical computer cart of claim 2 further comprising a vertical support pillar extending upward from the base.

6. A medical computer cart comprising:
a base defining a recess;
an on-board rechargeable battery;
a base power management system; and
an inductive charging receiver coil in electrical communication with the base power management system and adapted to generate electrical current, for use by the base power management system to charge the battery, based upon proximity to an operating inductive charging transmitter coil external to the medical computer cart;
wherein the recess has a size and a shape corresponding to a size and shape of a protrusion housing the inductive charging transmitter coil, wherein the shape of the protrusion is a frustum of an oval cone and the shape of the inductive charging transmitter coil is a frustum of an oval cone;
wherein the inductive charging transmitter coil is associated with a charging station having a perimeter shield with wings arranged to correct a trajectory of the base, when the base is approaching the charging station; and
wherein the base includes magnets positioned to align with corresponding magnets in the wings of perimeter shield of the charging station to help maintain a docking arrangement between the base and the charging station.

* * * * *